Jan. 1, 1963  G. HERR ET AL  3,071,023
NON-INJURIOUS RESILIENT ACTUATING KNOBS FOR USE
IN AUTOMOTIVE VEHICLES AND THE LIKE
Filed Feb. 9, 1960  3 Sheets-Sheet 1
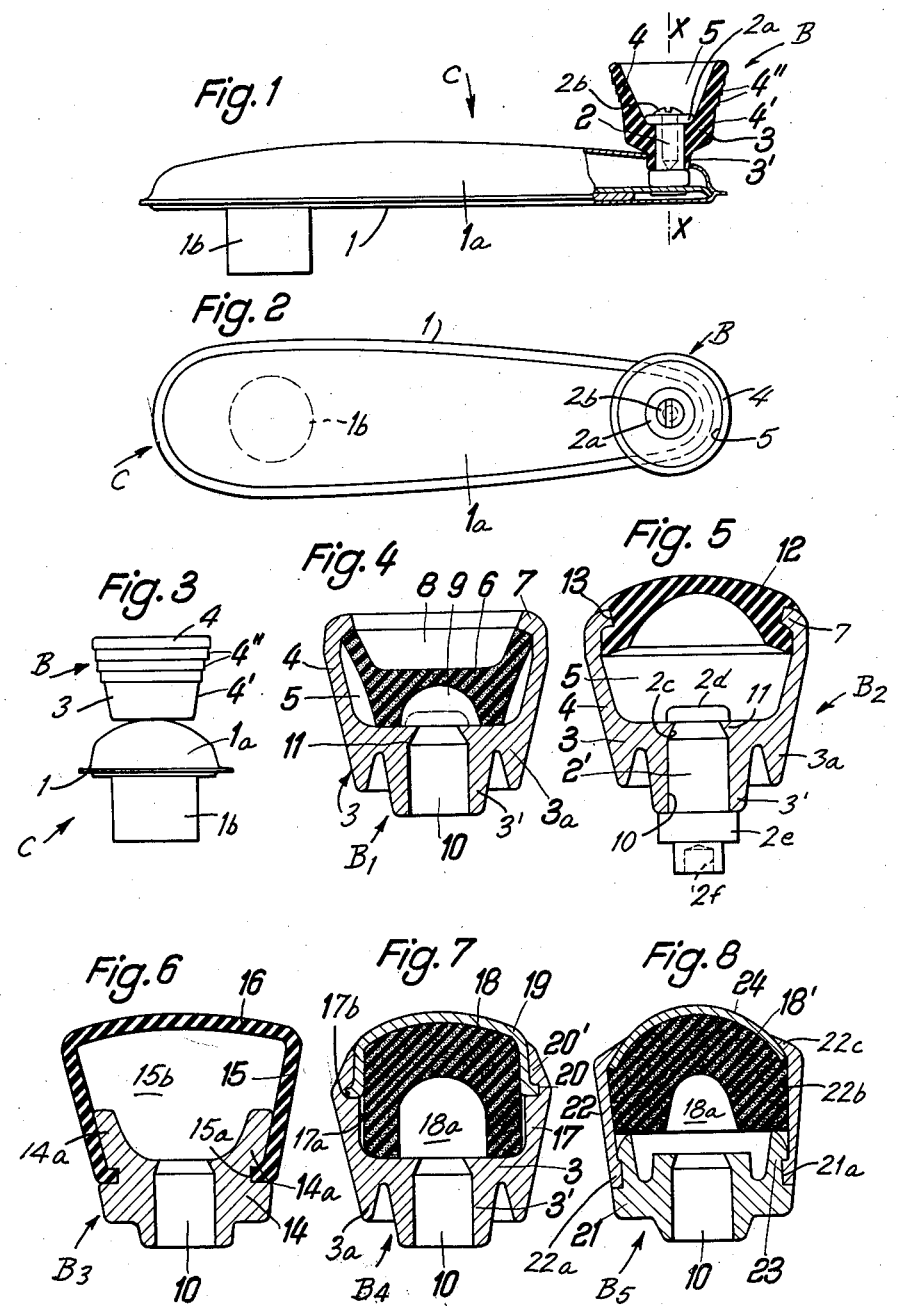
Inventors
GERHARD HERR
KURT CZIPTSCHIRSCH
BY
Michael S. Striker
their ATTORNEY

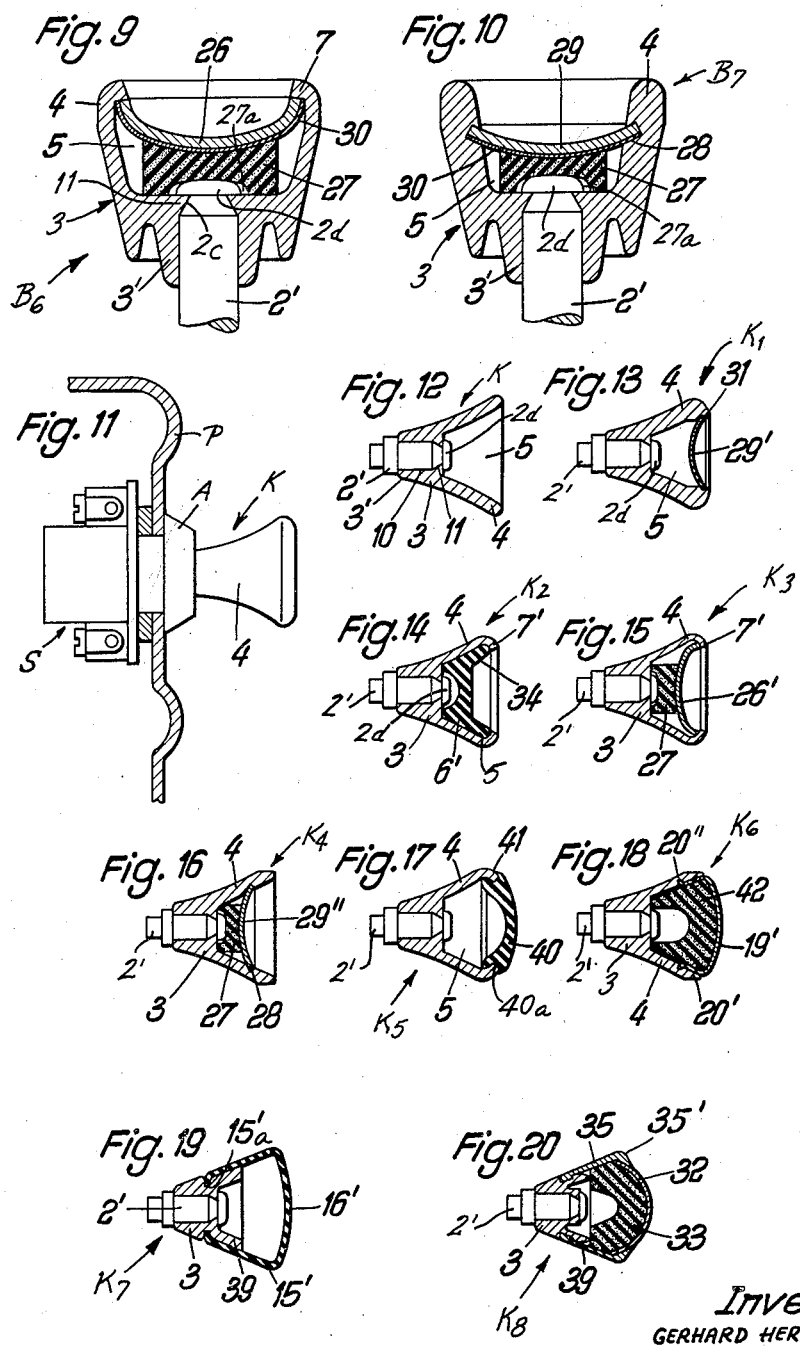

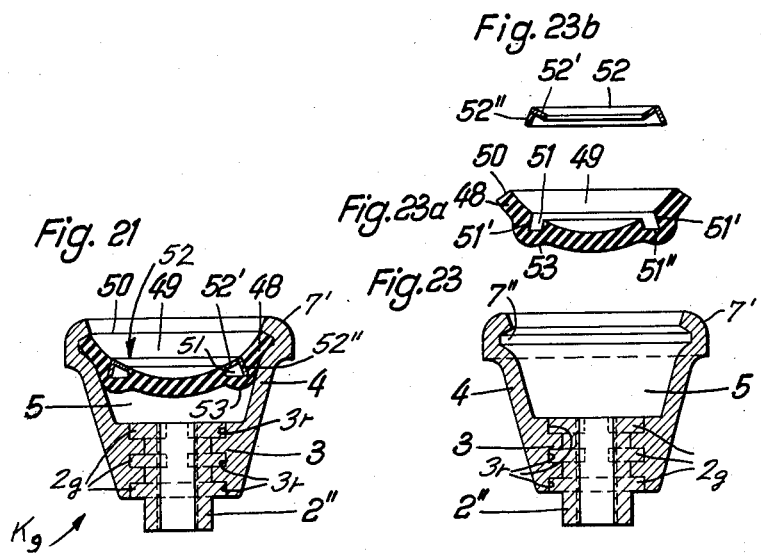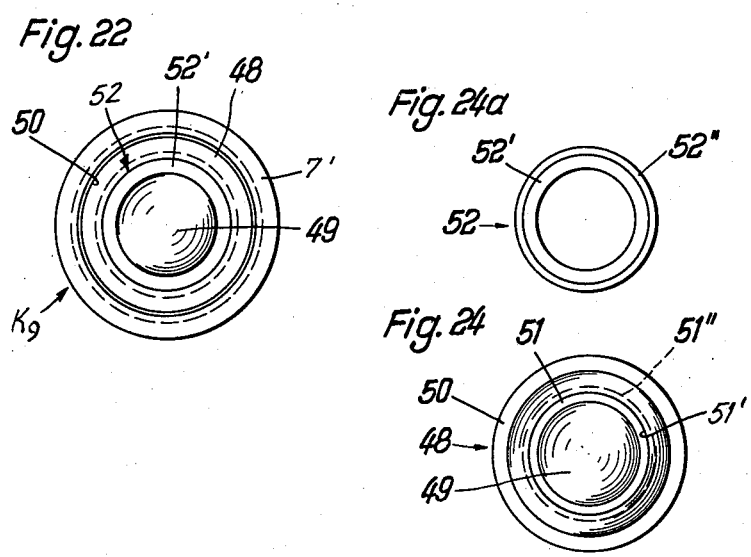

United States Patent Office 3,071,023
Patented Jan. 1, 1963

3,071,023
NON-INJURIOUS RESILIENT ACTUATING KNOBS FOR USE IN AUTOMOTIVE VEHICLES AND THE LIKE
Gerhard Herr, Wuppertal-Vohwinkel, and Kurt Czipt-schirsch, Wuppertal-Elberfeld, Germany, assignors to Gebr. Happich G.m.b.H., Wuppertal-Elberfeld, Germany
Filed Feb. 9, 1960, Ser. No. 7,650
20 Claims. (Cl. 74—545)

The present invention relates to improvements in actuating knobs or buttons of the type utilized on crank handles of window operating mechanisms in an automotive conveyance, on the instrument panel of a road vehicle, and for many similar purposes. More particularly, the invention relates to improvements in non-injurious, at least partially resilient actuating members for use in the interior of an automobile and the like.

It is already known to provide with a shock-absorbing cushion or to at least partially recess into the automobile frame all such parts which could cause injury to passengers in the event of a traffic accident. For example it was proposed to form the crank handles of window operating mechanisms, the handgrip members on the windows, the actuating knobs on the instrument panel and many similar projecting parts with a pad of resiliently yieldable material, or to provide pivotal connections for all such parts which could injure a passenger who is inadvertently hurled thereagainst with a considerable force such as develops in a collision, derailment, overturn or any other serious traffic mishap. The padding on and the pivotal mounting of such parts add to the overall cost of an automobile and often prevents a passenger from conveniently and rapidly operating the mechanisms or devices which are connected therewith.

According to another known proposal, the buttons or knobs on the instrument panel, the heads of shifting levers, and certain other actuating members are manufactured of a resiliently yieldable material, e.g. polyethylene, polyvinyl chloride or rubber, these materials being intended to absorb the impact and to prevent direct harmful contact with such component parts which must necessarily be made of a metallic or other non-yieldable material. It has been found that to merely manufacture the knobs, buttons and like projecting actuating elements of a resilient material is not always sufficient to prevent injury to the passengers of an automotive vehicle, it being equally or often even more important to impart to actuating members a specific configuration which insures that no injury, or at least no serious injury, will result from the collision of a passenger with a so-constructed actuating member.

Accordingly, it is an important object of the present invention to provide a resilient or at least partially resilient actuating knob or button of such configuration which will positively prevent hurtful contact between a passenger's body and the rigid retaining pin on which the knob is usually mounted.

Another important object of the present invention is to provide a resilient actuating knob of the above described type which is constructed in such a way as to retain its desired shape in the normal course of operation, e.g. when it is utilized to rotate the crank handle of a window lifting and lowering mechanism but which will yield to excessive forces regardless of the direction in which such forces are applied.

A further object of the invention is to provide an actuating member of the above outlined characteristics which is constructed and shaped in such a way that it even more fully conceals and cushions the customary rigid retaining pin when deformed into a shape different from its normal configuration during actual use.

An additional object of the instant invention is to provide an actuating button or knob for use on crank handles and instrument panels in automotive and like conveyances which consists of a single piece of resilient material or of a small number of component parts; which does not reduce the eye-pleasing appearance of the devices on which it is mounted; which may be manufactured in many sizes, colors and shapes without in any way affecting its non-injurious characteristics; and which may be manufactured at a very low cost of readily available materials.

A concomitant object of the present invention is to provide an actuating knob of the above outlined type which need not be made exclusively of resilient material though it will still retain its injury-preventing character, or which may be made at least in part of extremely soft resilient material which is shaped into components of such configuration that the fully assembled article can satisfactorily perform its intended purpose.

Still another object of the present invention is to provide a resilient actuating knob for use in an automobile or another type of fast-moving conveyance which is constructed and assembled in such a way that it can successfully withstand extended wear and tear and a large number of extensive, long-lasting deformations despite the fact that it consists at least in part of comparatively soft materials.

An additional object of the invention is to provide a cone-piece or a composite actuating knob of the above outlined characteristics which may be readily affixed to or separated from its retaining pin without the use of special tools and with exertion of comparatively small forces.

A further object of our invention is to provide an actuating knob which may embody waste particles of certain resilient synthetic plastic materials and which is assembled in such a way that the waste particles do not reduce the eye-pleasing appearance of the finished article.

Still another object of the present invention is to provide an actuating member of the above described type which may be combined with decorative metallic inserts in such a way that the inserts do not affect the impact-preventing action of the article.

An additional object of the invention is to provide a composite actuating member of the above outlined characteristics which may be readily taken apart in the event that one or more of its components require replacement, or if it is desired to separate the actuating member from its retaining pin.

A further object of the invention is to provide a non-injurious actuating knob which may be utilized for imparting rotational, linear or many other types of movements to the devices or apparatus connected therewith, and which may be made of insulating material in the event that it is utilized for operating an electric switch or other apparatus connected with a source of electrical energy.

With the above objects in view, the invention resides essentially in the provision of a comparatively strong-walled, either resilient or tough bottom member which is either integrally or removably connected with a substantially pot-shaped, preferably at least partially conical, collapsible hollow wall member of resilient material, and which comprises a hub adapted to surround the customary retaining pin whose purpose is to connect the actuating member with a crank handle, with a shaft, with an instrument panel, with an electric switch or the like. The wall member and the bottom member may be joined by means of a readily separable tongue-and-groove connection or the like, and the cavity defined by the normally slightly conical wall member may be at least partially filled with a form-restoring layer of foam rubber or like material which may also serve as a means for holding in requisite position a concave or convex cover often utilized to seal the inlet to the cavity in the wall member and to prevent deformation of the wall member in response to comparatively small axial or radial stresses. Owing to the formation of such a cavity, the wall member is deformable, i.e. collapsible, in the axial as well as in radial directions and, when deformed, even more fully cushions the retaining pin or the bottom member so that no injury will be sustained by a passenger who might be hurled against the improved actuating member during a traffic accident.

The wall member or its cover may be formed or combined with decorative elements, such as shoulders, metallic rings, and the like, which enhance the appearance of the article, and the bottom member may be formed with one, two or more annular retaining shoulders or beads which are receivable in the grooves of a suitably shaped retaining pin to prevent unintentional separation of the actuating member.

The cavity in the wall member may be filled with prefabricated or irregular particles of foam rubber or the like; in the latter case, the normally transparent cover of the actuating member is preferably coated with a layer of light reflecting material to prevent observation of such irregular inserts.

The connection between the wall member and the cover may be of the tongue-and-groove type, or one thereof may be formed with an annular flange which either overlaps or extends into a corresponding recess of the other component.

The novel features which are considered as characteristic for the invention are set forth in particular in the appended claims. The invention itself, however, both as to its construction and its method of operation, together with additional objects and advantages thereof, will be best understood from the following detailed description of certain specific embodiments when read in connection with the accompanying drawings in which:

FIG. 1 is a partial side elevation and partial central section through a crank handle comprising a non-injurious resilient actuating member which is constructed in accordance with one embodiment of our invention;

FIG. 2 is a top plane view of the crank handle;

FIG. 3 is an end view of the crank handle as seen from the right-hand side of FIG. 1 or 2;

FIG. 4 is an enlarged axial section through a modified non-injurious actuating member whose conical cavity receives a soft, form-restoring, resilient cushion;

FIG. 5 is an axial section through a different actuating member whose cavity is sealed by a readily separable resilient cover of convex configuration;

FIG. 6 is an axial section through an actuating member whose resilient, one-piece combined wall and cover member is releasably connectable to a comparatively tough, cup-shaped bottom member;

FIG. 7 illustrates in axial section a further embodiment of our invention according to which the cavity defined by the resilient conical wall of the actuating member is filled by a sponge-rubber or like cushion and is sealed by a substantially hemispherical cap of resilient material;

FIG. 8 is axial section through an actuating member which is similar to the one shown in FIG. 7 with the exception that the wall is releasably secured to the bottom member and that the wall retains the cover in a slightly different way;

FIG. 9 is an axial section through a further modification of the actuating member according to which the resilient cushion is held in the conical cavity defined by the wall member with the help of a concave cover whose inner side is coated with a layer of non-transparent, light-reflecting material;

FIG. 10 is an axial section through a further modification of the actuating member comprising a differently mounted concave cover member;

FIG. 11 is a vertical section through an instrument panel mounting an electric switch and a non-injurious actuating member therefor, the actuating member being shown in side elevation and partially recessed into an annular member which is fixed to the instrument panel;

FIG. 12 is an axial section through the actuating member of FIG. 11;

FIG. 13 is an axial section through a slightly modified actuating member whose conical cavity is sealed by a concave cover member;

FIG. 14 shows a further modification according to which the conical cavity of the actuating member is partially filled by a shaped cushioning element;

FIG. 15 is an axial section through an actuating member which comprises an irregularly shaped cushioning member and a concave cover therefor;

FIG. 16 illustrates a further modification of the actuating member which is similar to the one shown in FIG. 15, with the exception that the cover is mounted in a different way;

FIG. 17 is an axial section through an actuating member or knob whose conical cavity is sealed by a convex cover of resilient material;

FIG. 18 is an axial section through a knob which is similar to the actuating member illustrated in FIG. 7;

FIG. 19 is an axial section through a knob which consists of two parts and whose combined resilient wall and cover member is releasably secured to the bottom member;

FIG. 20 is an axial section through a knob whose construction is similar to the construction of the actuating member shown in FIG. 8;

FIG. 21 is an axial section through a further modification of the non-injurious actuating member embodying our invention which comprises a concave cover of resilient material and a resilient decorative ring embedded in the outer side of the cover;

FIG. 22 is a top plan view of the actuating member shown in FIG. 21;

FIG. 23 is an axial section through the main component part constituting the bottom and the conical wall of the actuating member shown in FIGS. 21 and 22;

FIG. 23a is an axial section through the convex cover of the actuating member shown in FIGS. 21 and 22;

FIG. 23b is an axial section through the decorative ring;

FIG. 24 is a top plan view of the part shown in FIG. 23; and

FIG. 24a is a top plan view of the decorative ring shown in FIG. 23b.

Referring now in greater detail to the illustrated embodiments, and first to FIGS. 1 to 3, there is shown a crank handle C of the type similar to the crank handles disclosed in our copending patent application Serial No. 7,693 filed on Feb. 9, 1960 for "Crank Handles for Window Actuating Mechanisms in Automotive Vehicles and the Like." The crank handle comprises a plate-like crank arm 1 whose outer side is concealed by an impact-preventing pad 1a; a nave or boss 1b by means of which the crank handle may be removably connected to the shaft of a window actuating mechanism in the door or frame of an automotive vehicle; a retaining pin 2; and a novel non-injurious actuating button or handgrip member B which latter constitutes one embodiment of our present invention and is removably secured to the crank pin 2. The rear or inner side of the crank arm 1 is smooth so that the latter may be mounted in immediate proximity of the automobile frame without generating noticeable frictional forces when the crank handle C is operated by its actuating button B to rotate about the axis of the nave 1b.

The button or knob B comprises an annular boss or hub 3' which surrounds a portion of the crank pin 2 and projects from the main body portion or bottom 3, the latter also surrounding the pin 2 and being secured thereto by a washer 2a which is held in the position of FIGS. 1 and 2 by a screw 2b threaded into the coaxial tapped bore formed in the outer end of the pin 2. The entire button B is made of a resilient material, preferably a synthetic plastic substance such as polyethylene or polyvinyl chloride which contains a requisite percentage of softening agents so that the material attains a desired degree of softness which insures that a passenger will not sustain serious injury upon impact against the member B in the course of a traffic accident.

As is best shown in FIG. 1, the configuration of the button B is similar to that of a crucible or pot having a comparatively thick bottom or base 3 and an upstanding, comparatively thin, either cylindrical but preferably slightly conical wall 4, the latter extending from the outer side of the bottom 3 whose inner side is integrally connected with the aforementioned annular extension or hub 3'. The conical recess or cavity 5 formed within the wall 4 enables the latter to be resiliently collapsible by yielding to certain pressures acting in directions enclosing an angle with the symmetry axis $x$—$x$ of the button B, e.g. the wall 4 will readily yield to a reasonably strong force exerted in the direction parallel with the plane of the crank arm 1.

On the other hand, when the wall 4 is subjected to certain stresses which are parallel with the axis $x$—$x$, it can be collapsed or deformed into the shape of a bellows upon compression in a direction toward the bottom or base 3. Such deformation is facilitated by the conical shape of the wall 4 and also owing to the provision of annular steps or shoulders 4" formed in the conical outer side 4' of the part 4. This outer side tapers outwardly in a direction away from the bottom 3. The shoulders 4" also serve a decorative purpose by enhancing the outward appearance of the button B. While collapsing into the shape of a bellows in response to axial stress, the wall 4 gradually reduces the force of such stresses and prevents a sudden strong impact against the pin 2 or the washer 2a.

The material of the wall 4 may be softer than that of the bottom 3 and the latter's hub 3'. This insures longer wear of the button and at the same time insures that the wall 4 will readily yield to moderate pressures in the event of accidental impact thereagainst. The parts 3, 4 may be integrally joined with each other, preferably without the formation of a seam therebetween so as to insure that the appearance of the button remains pleasing to the eye. However, the material of the wall 4 should have sufficient rigidity such as will enable a passenger to conveniently rotate the crank handle C when he desires to open or close the window in an automotive conveyance or the like. As will be fully explained hereinafter, the improved actuating button may be used with great advantage not only for opening and closing of windows in automobiles but also on the instrument panel and for many other purposes, i.e. wherever it is desired to prevent harmful impact against the button or its retaining pin 2.

FIG. 4 shows a slightly modified actuating button or knob $B_1$ whose conical wall 4 defines a cavity 5 which is partially filled with a resilient insert in the form of a cushion or pad 6. This cushion abuts against the outer side of the bottom 3 and bears against the inwardly turned annular flange 7 at the free outer end of the wall 4. Alternately, the flange 7 may be replaced by a series of spaced inwardly turned prongs or the like. The outer side of the cushion 6 is formed with a cup-shaped depression 8; this cushion also comprises a second depression in the form of a concave cutout 9 which faces the exposed side of the bottom 3 and accommodates the head of a slightly modified pin such as will be described in connection with FIG. 5. The purpose of the cushion or insert 6 is to cover the outer end of the retaining pin and also to lend some rigidity to the wall 4 such as is necessary for a satisfactory finger grip upon the button $B_1$ when the latter is operated by a passenger who desires to open or close the window in an automobile or the like. The softness of the cushion 6 is such that it may be readily pushed into the cavity 5 through the reduced opening defined by the flange 7, whereupon the cushion is free to expand and to engage the inner side of the flange.

The bottom 3 has a coaxial bore 10 and an annular, inwardly extending shoulder or bead 11 which projects into the outer end of the bore 10 and is receivable in a suitable annular groove of the retaining pin. Thus, the shoulder 11 constitutes means for releasably securing the button $B_1$ to its retaining pin and hence to a crank arm, to an instrument panel or the like. The snap-on connection between the button $B_1$ and its pin may be terminated by exerting a sufficient axial force upon the button in order to withdraw the shoulder 11 from its groove in the pin.

The base or bottom 3 of the button $B_1$ is formed with a comparatively long annular extension or hub 3', and with a partially decorative and in part reinforcing annular skirt 3a which latter surrounds and partially conceals the hub 3'.

Referring now to FIG. 5, there is shown an actuating button or knob $B_2$ whose base 3 and wall 4 are identical with the similarly numbered component parts of the button $B_1$, and in which the cushion 6 is replaced by a convex cover or cap 12 formed with a circumferential groove 13 to receive a portion of the flange 7. The flange 7 and the groove 13 constitute a tongue-and-groove connection for the cover 12 which is of the so-called snap-on type and insures that the cover remains in place in the event of a slight or even moderate resilient deformation of the wall 4.

The slightly modified retaining pin 2' is received in the bore 10 of the bottom 3 and is formed with an annular groove 2c which receives the aforementioned annular shoulder 11. This shoulder abuts against the underside of the pin head 2d and thus retains the button $B_2$ on the member 2'. The free inner end of the hub 3' abuts against a larger-diameter portion or boss 2e of the pin, the latter also having a tapped blind bore 2f which receives a non-represented retaining screw by means of which the pin 2' is removably secured to a crank arm, to an instrument panel or the like.

In the embodiment of FIG. 6, the actuating button or knob $B_3$ comprises a bottom 14 of a tough, comparatively hard material, e.g. a hard rubber-like substance, and a comparatively soft, more readily deformable conical wall 15 which is made of resilient material and is integrally formed with a slightly convex cover or cap 16. The wall 15 comprises an annular inwardly extending flange 15a of arcuate cross-sectional contour which is removably received in a peripheral groove 14a of the bottom member 14. The latter's bore 10 may receive a retaining pin of the type shown in FIG. 5.

It will be readily understood that the covers 12, 16 of FIGS. 5 and 6 need not be formed as separate parts but that they may constitute integral components of a one-piece actuating button. The cavities 5, 15b of the buttons $B_2$, $B_3$, respectively, may be filled with a soft, yieldable substance such as fragments of sponge rubber, which is introduced through the bore 10 in the event that the cover 12 or 16 forms an integral part of the bottom 3 or 14, respectively.

The tongue-and-groove connections shown in FIGS. 5 and 6 airtightly seal the cavity defined by the wall 4 or 15. The air entrapped in the cavity constitutes a resilient cushion which reduces the force of impact against the head 2d or against the cup-shaped outwardly extending portion 14a of the hard bottom member 14. In addition, the air entrapped in the cavity 5 or 15b prevents too rapid deformation of the wall 4 or 15, respectively, by acting as an internal support for the wall.

Referring now to FIG. 7, there is shown a button or knob B₄ comprising a bottom or base 3, similar to the one shown in FIGS. 4 and 5, which is integrally formed with a resilient conical wall 17. The cavity 17a within the wall 17 is substantially filled by a sponge rubber or foam rubber insert or cushion 18. The latter comprises a concave cutout 18a for the head of the non-represented retaining pin which is insertable through the coaxial bore 10 of the bottom member 3. To prevent expulsion of the cushion 18, the button B₄ comprises a cupped cover or cap 19 whose outwardly extending annular flange 20 is received in an internal annular groove 17b of the conical wall 17. The latter's outermost annular portion 20' bears against the outer side of the cover 19 and constitutes additional means for retaining the parts 17, 18 and 19 in the illustrated position.

FIG. 8 illustrates a slight modification of the embodiment shown in FIG. 7 according to which the button or knob B₅ comprises a comparatively hard bottom or base 21 which constitutes a separate, self-supporting unit and is releasably connected with a slightly conical resilient wall 22. The latter's reduced-diameter end is formed with an inwardly extending annular flange 22a which is snapped into an annular groove 21a provided in the periphery of the bottom 21. The outwardly projecting annular portion or cup 23 of the bottom 21 extends into the cavity 22b defined by the wall 22 and serves as an abutment for the resilient insert or cushion 18' which fills said cavity and is formed with a cutout 18a' for the head of the non-represented retaining pin. The outer side of the insert 18' is covered by a flangeless convex cover or cap 24 whose annular edge portion is forced beneath the inwardly extending edge portion or flange 22a at the free outer end of the wall 22. The cover 24 prevents expulsion of the insert 18' through the opening within the flange 22a because its material is at least slightly less resilient than the material of said insert.

FIG. 9 illustrates an actuating button or knob B₆ whose bottom 3 and wall 4 are identical with the similarly numbered component parts of the button B₁ shown in FIG. 4. The cavity 5 which is formed within the conical wall 4 receives a concave cover or cap 26 whose annular end face abuts against the inner side of the inwardly extending flange 7. The comparatively thin cover 26 consists of a resilient synthetic plastic material and, as stated, preferably assumes a concave or inverted hemispherical shape. Its convex side abuts against and holds in position a foam-rubber or like insert 27 which is thereby pressed against the outer side of the bottom 3 in the cavity 5, the insert or cushion 27 having a cutout 27a for the head 2d of the retaining pin 2'. The insert 27 may consist of a scrap piece of foam rubber or a similar very soft synthetic plastic material. Its exact configuration is not important save for the provision of the aforementioned cutout 27a for the head 2d. When the insert 27 consists of an irregular piece of waste material, it is preferably concealed from view by the provision of a non-transparent, light-reflecting layer 30 which is applied to the convex side of the cover 26. The latter preferably consists of a transparent or at least translucent substance.

FIG. 10 illustrates a slightly modified actuating button or knob B₇ whose comparatively thick, slightly conical wall 4 is formed with an internal annular groove 28 receiving the annular edge portion of a concave cover or cap 29. The convex inner side of the cover 29 is coated with a layer of light reflecting, non-transparent material 30 which is adjacent to the outer side of a foam-rubber or like insert 27 similar to the one described in connection with FIG. 9. Owing to its concave shape, the resilient cover 29 is capable of retaining the insert in requisite position and its reflecting layer 30 fully conceals the member 27 which is particularly advisable when the latter is of irregular shape such as would adversely affect the appearance of the actuating button B₇.

The concave covers 26, 29 shown in FIGS. 9 and 10 permit deformation of the wall 4 not only in the axial but also in radial directions. Despite such deformation, the covers are not likely to move out of position in the normal course of operation. The insert 27 maintains the covers 26, 29 in the illustrated position and, in the event of a deformation, rapidly returns the covers into their normal position. By bearing against the convex surfaces of members 26, 29, the inserts 27 urge these members into requisite engagement with the wall 4 whereby the members 26, 29 perform an expanding or spreading action which also contributes to their retention in the cavity 5.

Referring now to FIG. 11, there is shown an actuating button or knob K which may serve as a means for pulling or as a device for rotating one or more parts connected with its retaining pin, e.g. for operating a rotary or push-pull electric switch S; as a knob on a toggle switch; as a handgrip member for either inserting or withdrawing a device from its socket; as a button on a crank handle; or for many other purposes. The button or knob K may be fully exposed or partially recessed into its supporting structure, e.g. into a crank arm, into an instrument panel P, into a switch housing, into a decorative annulus A, or the like. As is best shown in FIG. 12, the pot- or crucible-shaped knob K is mounted on a retaining pin 2' of previously described design whose head 2d is engaged by an inwardly extending shoulder 11 forming part of the bottom 3 which latter, together with the conical wall 4, constitutes the one-piece member K. The head 2d extends into the conical cavity 5 defined by the wall 4. As is shown in FIG. 11, the annulus A which is fixed to the outer side of the instrument panel P partially conceals the periphery of the hub 3', the latter forming part of the bottom 3 and receiving in its coaxial bore 10 the body of the retaining pin 2'. The wall 4 is comparatively thin, and its frusto-conical periphery is smooth though, if desired, it may be formed with annular shoulders 4' of the type illustrated in FIG. 1. It is preferred to form the bottom 3 of a tough, comparatively hard, synthetic plastic material and to provide a seamless integral connection between the parts 3 and 4. As will be described hereinafter, the integral connection between the bottom and the wall of the knob K may be replaced by a readily separable tongue-and-groove joint or the like.

As was fully explained hereinabove in connection with FIG. 4, the provision of the cavity 5 enables the wall 4 to yield to axial or radial pressure, i.e. the wall 4 is resiliently deformable in a direction parallel with the axis of the retaining pin 2' as well as in directions at right angles thereto. Under axial stresses, the wall 4 is deformed into the shape of a bellows and thereby prevents injurious impact against the head 2d of the retaining pin 2' or against the comparatively hard bottom member 3. The conical, and more particularly frusto-conical shape of the knob K also contributes to ready deformation of the wall 4 into the shape of a bellows whenever a reasonably strong axial pressure is applied thereagainst.

FIG. 13 shows a modified button or knob K₁ whose cavity 5 is sealed by a slightly concave discoid cover or cap 29' which is retained in the wall 4 in a manner similar to that fully described in connection with FIG. 10, i.e. there is provided a releasable tongue-and-groove joint between the parts 4 and 29' wherein the peripheral edge of the cover constitutes the tongue and wherein the groove 31 is formed in the interior of the conical wall 4. This joint insures retention of the cover even after considerable deformation of the wall 4 and though also made of a resilient material, the cover assists the wall 4 in maintaining its conical shape when grasped by the fingers of an operator. In addition, the cover conceals the head 2d of the retaining pin 2'.

FIG. 14 illustrates a button or knob $K_2$ whose construction is similar to that of the member $B_1$ shown in FIG. 4, with the exception that the skirt $3a$ is omitted. The cavity 5 is partially filled by a soft, rubber-like insert 6' whose outwardly projecting annular extension 34 abuts against the inner side of an inwardly turned flange 7' at the outermost end of the conical wall 4. The inner face of the insert 6' abuts against the exposed end face of the bottom 3. The cutouts in both end faces of the insert contribute to ready deformability of the wall 4; in addition, one of these cutouts provides room for the head $2d$ of the retaining pin 2'.

The knobs $K_3$ and $K_4$ of FIGS. 15 and 16 are similar to the members $B_6$ and $B_7$ shown in FIGS. 9 and 10, respectively. The knob $K_3$ comprises a concave cover 26' which retains a sponge-rubber insert 27 and abuts with its annular end face against the inner side of the flange 7'. In FIG. 16, the foam- or sponge-rubber insert 27 is retained in illustrated position by a slightly concave discoid cover or cap 29" whose annular edge portion is snapped into an annular groove 28 provided in the inner side of the conical wall 4. The inserts 27 bear against the convex inner sides of covers 26', 29" and constitute additional means for maintaining the covers in the illustrated position. Here, too, a reflecting layer may be applied to the convex inner sides of the covers 26', 29" if the latter consist of a transparent or translucent synthetic plastic substance and if the insert 27 is an irregular piece of waste material such as would impair the appearance of the knobs $K_3$ and $K_4$.

FIG. 17 illustrates a knob $K_5$ which comprises an outwardly arched, convex, resilient cover or cap 40 similar to the member 12 shown in FIG. 5. The cover 40 seals the cavity 5 and is formed with an annular groove $40a$ which releasably receives the inwardly extending annular flange 41 at the free outer end of the conical wall 4.

Save for a slightly different configuration of the bottom 3 (without the skirt $3a$), the knob $K_6$ of FIG. 18 is similar to the member $B_4$ shown in FIG. 7. The cavity defined by the wall 4 is nearly completely filled by a soft, resilient insert or cushion 42 which latter is retained by a cover or cap 19' whose outwardly extending annular flange 20" is received in the annular groove of the wall 4, the latter's outermost annular portion 20' bearing against the periphery of the cover 19' and holding the same in the illustrated position. The cover 19' is made of a resilient material whose form-retaining and restoring action upon the wall 4 is sufficient to enable an operator to either rotate, pull or depress the knob $K_6$ without noticeable deformation in the normal course of operation. The cover 19' is comparatively thin and maintains its shape owing to the expanding action of the soft resilient insert 42 whose inner end face abuts and bears against the bottom 3. The mounting of the knob $K_6$ on its retaining pin 2' is the same as described hereinabove.

The knob $K_7$ in FIG. 19 is similar to the button $B_3$ of FIG. 6. It comprises a comparatively hard, tough, and hence wear-resistant bottom or base 3 whose conically formed extension or cup 30 projects into the interior of a combined resilient wall and cover 15', 16', the free end of the wall 15' being formed with an inwardly extending annular flange $15a'$ which is releasably held in a complementary annular groove formed in the periphery of the bottom 3. The extension 39 bears against the wall 15' and holds the latter against undesired deformation, for example, when the knob $K_7$ is grasped by a person's fingers in the normal course of operation.

Referring now to FIG. 20, there is shown a knob $K_8$ which is somewhat similar to the actuating member $B_5$ of FIG. 8. The cavity within the snap-on resilient wall 35 receives the aforementioned annular extension 39 of the bottom member 3 and the wall is releasably secured to the bottom by means of a tongue-and-groove joint of the type fully described in connection with FIG. 8. The inwardly extending flange 35' at the outermost end of the separable wall 35 retains a thin, resilient, convex cover or cap 32 which is applied over the spherically shaped outermost portion of the soft insert 33, the latter abutting against the annular extension 39 and maintaining the cover 32 in the illustrated position. This insert 33 immediately returns the cover into the position of FIG. 20 as soon as a deforming pressure upon the wall 35 and/or the member 32 ceases.

It will be readily understood that the conicity of the walls and of the bottoms forming part of the various hereinabove described buttons or knobs may be varied within a wide range, depending upon the desired degree of resiliency. It is equally possible to replace the pin 2 or 2' by other types of retaining means without requiring substantial changes in the design of the actuating member.

Referring finally to the embodiment shown in FIGS. 21 to $24a$, the fully assembled non-injurious button or knob $K_9$ is shown in FIGS. 21 and 22. It comprises a bottom or base 3 which is integral with an outwardly extending frusto-conical or bell-shaped wall 4 defining therewithin a conical cavity 5 which is sealed by a modified cover or cap 48. The latter is made of a resilient material and assumes a concave shape defining at its outer side a convex depression 49. The outer side of the cover in the depression 49 is formed with a coaxial annular groove 51 which is inwardly spaced from the annular end face 50. The groove 51 receives a decorative metallic ring 52, the latter being best shown in FIGS. $23b$ and $24a$. As can be observed in FIG. $23b$, the ring 52 is of V-shaped cross-sectional contour, its inner portion or leg 52' sealing the open side of the groove 51 substantially tangentially to the wall of the depression 49. The other portion or leg 52' abuts against the undercut annular face 51' in the groove 51 and extends inwardly toward and into abutment with the plano bottom face 51" in the groove 51 of the cover 48. The exact configuration of the cover 48 is best shown in FIGS. $23a$ and 24. It will be seen that the convex underside of the member 48 defines an annular bead 53 which bears against the conical wall 4 in the cavity 5 of the wall 4. The free outer end of the wall 4 is formed with an inwardly extending, preferably reinforced flange 7' which is undercut to define an annular groove 7' (see FIG. 23) receiving the edge portion of the cover 48 including the latter's annular end face 50.

In mounting the decorative metallic ring 52, the cover 48 is at least slightly inverted by exerting a certain pressure against its underside whereby the groove 51 expands and may readily receive the member 52 without the exertion of any force. In the next step, the cover 48 is returned into the shape of FIG. $23a$ and is thereupon inserted into the cavity 5. The annular end face 50 and the outer side of the annular bead 53 bear against the flange 7' and the wall 4, respectively, and insure that the knob $K_9$ retains its shape in the normal course of operation. However, any excessive pressures will bring about elastic deformation of the wall 4 and of its cover 48.

It will be noted that the knob $K_9$ is mounted on a slightly different retaining pin 2" which is formed with a series of coaxial larger-diameter circumferential ribs $2g$ each receivable in one of the annular recesses $3r$ formed in the body of the bottom 3. Thus, the retaining pin 2" is even more fully concealed because it does not extend into the cavity 5, and its retaining action is improved by the provision of two, three or more ribs $2g$. However, it is to be understood that the knob $K_9$ may utilize a retaining pin of the type shown in FIG. 1 or FIG. 5, the use of such pins requiring only slight modifications in the design of the bottom member 3.

Because the hard ring 52 is mounted at a distance from the wall 4, it does not prevent deformation of this wall and of the cover 48 in the event of a traffic accident. Being of V-shaped cross-sectional contour, the ring will be readily deformed under mediate stress particularly since its portions 52′, 52″ preferably consist of a very thin metallic or like plate. In fact, any substantial force exerted in radial directions of the wall 4 will bring about automatic ejection of the member 52.

The annular bead 53 reinforces the convex cap 48 at a point where the latter is weakened by the formation of the annular groove 51, i.e. the bead insures that the cross-section of the cover retains a substantially uniform thickness. Since the bead is aligned with the groove 51, it does not prevent an operator from deforming the cover 48 during insertion or removal of the decorative ring 52.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A substantially pot-shaped actuating knob for use in the interior of an automotive vehicle or the like comprising, in combination, a thick-walled annular bottom member having a first and a second side; a coaxial annular hub connected to the first side of said bottom member; and a comparatively thin coaxial wall member connected to the second side of said bottom member, at least said wall member consisting of resiliently yieldable material and defining therewithin a cavity extending to said bottom member.

2. A substantially pot-shaped actuating knob for use in the interior of an automobile or the like comprising, in combination, a thick-walled annular bottom member having a first side and a second side; a coaxial annular hub connected to the first side of said bottom member; a comparatively thin coaxial wall member connected to the second side of said bottom member, said wall member consisting of resiliently yieldable material, defining therewithin a cavity extending to said bottom member, and having an open end distant from said bottom member; and a resilient cover member releasably connected with and sealing the open end of said wall member.

3. A substantially pot-shaped actuating knob for use in the interior of an automobile or the like comprising, in combination, a thick-walled annular bottom member having a first side and a second side; a coaxial annular hub connected to the first side of said bottom member; a comparatively thin coaxial wall member connected to the second side of said bottom member, said wall member consisting of resiliently yieldable material, defining therewithin a cavity extending to said bottom member, and having an open end distant from said bottom member; and a resilient convex cover member releasably connected with and sealing the open end of said wall member.

4. A substantially pot-shaped actuating knob for use in the interior of an automobile or the like comprising, in combination, a thick-walled annular bottom member having a first side and a second side; a coaxial annular hub connected to the first side of said bottom member; a comparatively thin coaxial wall member connected to the second side of said bottom member, said wall member consisting of resiliently yieldable material, defining therewithin a cavity extending to said bottom member, and having an open end distant from said bottom member; a resilient cover member releasably connected with and sealing the open end of said wall member; and a soft, resilient cushion inserted into and at least partially filling said cavity.

5. A substantially pot-shaped actuating knob for use in the interior of an automobile or the like comprising, in combination, a thick-walled annular bottom member having a first side and a second side; a coaxial annular hub connected to the first side of said bottom member; a comparatively thin coaxial wall member connected to the second side of said bottom member, said wall member consisting of resiliently yieldable material, defining therewithin a cavity extending to said bottom member, and having an open end distant from said bottom member; a resilient cover member releasably connected with and sealing the open end of said wall member; and a cushion of foam-rubber like material inserted into and at least partially filling said cavity, said cushion bearing against said wall member, against said bottom member and against said cover member.

6. A substantially pot-shaped actuating knob for use in the interior of an automotive vehicle or the like comprising, in combination, a thick-walled annular bottom member consisting of a tough, hard, synthetic plastic material, said bottom member having a first and a second side; a coaxial annular hub integral with and extending from the first side of said bottom member; and a comparatively thin coaxial wall member connected to the second side of said bottom member, said wall member consisting of resiliently yieldable material and defining therewithin a cavity extending to said bottom member.

7. A substantially pot-shaped actuating knob for use in the interior of an automotive vehicle or the like comprising, in combination, a thick-walled annular bottom member having a first and a second side; a coaxial annular hub connected to the first side of said bottom member; and a comparatively thin frusto-conical, coaxial wall member connected to the second side of said bottom member, at least said wall member consisting of resiliently yieldable material and defining therewithin a cavity extending to said bottom member, said wall member having a conical outer side tapering outwardly in a direction away from said bottom member.

8. A substantially pot-shaped actuating knob for use in the interior of an automotive vehicle or the like comprising, in combination, a thick-walled annular bottom member having a first and a second side; a coaxial annular hub connected to the first side of said bottom member, said hub and said bottom member having a coaxial bore and at least one annular shoulder projecting into said bore; and a comparatively thin coaxial wall member connected to the second side of said bottom member, at least said wall member consisting of resiliently yieldable material and defining therewithin a cavity extending to said bottom member.

9. A substantially pot-shaped actuating knob for use in the interior of an automobile or the like comprising, in combination, a thick-walled annular bottom having a first side and a second side; a coaxial annular hub integrally connected to and extending from the first side of said bottom; a comparatively thin coaxial wall member connected to the second side of said bottom, said wall member consisting of resiliently yieldable material, defining therewithin a cavity extending to the second side of said bottom, and having an open end distant from said bottom; and a resilient cover member for sealing the open end of said wall member, one of said members defining an annular groove and the other of said members defining an annular flange extending into said groove and releasably connecting the cover member with said wall member.

10. A substantially pot-shaped actuating knob for use in the interior of an automobile or the like comprising, in combination, a thick-walled annular bottom having a first side and a second side; a coaxial annular hub integrally connected to and extending from the first side of said bottom; a comparatively thin coaxial wall member connected to the second side of said bottom, said wall member consisting of resiliently yieldable material, defining therewithin a cavity extending to the second side of said bottom, and having an open end distant from said bottom; and a resilient concave cover member inserted into and sealing the open end of said wall member, one of said members defining an annular groove and the other of said members defining an annular flange extending into said groove and releasably connecting the cover member with said wall member.

11. A substantially pot-shaped actuating knob for use in the interior of an automobile or the like comprising, in combination, a thick-walled annular bottom having a first side and a second side; a coaxial annular hub integrally connected to and extending from the first side of said bottom; a comparatively thin coaxial wall member connected to the second side of said bottom, said wall member consisting of resiliently yieldable material, defining therewithin a cavity extending to the second side of said bottom, and having an open end distant from said bottom; and a resilient cover member for airtightly sealing the open end of said wall member, one of said members defining an annular groove and the other of said members defining an annular flange extending into said groove and releasably connecting the cover member with said wall member.

12. A substantially pot-shaped actuating knob for use in the interior of an automobile or the like comprising, in combination, a thick-walled annular bottom having a first side and a second side; a coaxial annular hub integrally connected to and extending from the first side of said bottom; a comparatively thin coaxial wall member connected to the second side of said bottom, said wall member consisting of resiliently yieldable material, defining therewithin a cavity extending to the second side of said bottom, and having an open end distant from said bottom; a resilient concave cover member for sealing the open end of said wall member, one of said members defining an annular groove and the other of said members defining an annular flange extending into said groove and releasably connecting the cover member with said wall member; and a soft, resilient cushion inserted into said cavity between the bottom and said cover member for biasing the latter in outward direction whereby the flange is urged into said groove to prevent ready separation of the cover member from said wall member.

13. The combination of a substantially pot-shaped actuating knob for use in an automotive vehicle or the like and comprising a thick-walled annular bottom having a first and a second side, a coaxial annular hub connected to the first side of said bottom, said hub and said bottom having a coaxial bore and defining at least one annular shoulder extending into said bore, and a comparatively thin coaxial wall connected to the second side of said bottom, at least said wall consisting of a resiliently yieldable material and defining therewithin a cavity extending to said bottom member, with a retaining pin having at least one annular groove and received in said bore in such manner that the shoulder extends into said groove whereby the actuating knob is releasably retained on said pin.

14. A substantially pot-shaped actuating knob for use in the interior of an automotive vehicle or the like comprising, in combination, a thick-walled annular bottom consisting of a tough, comparatively hard synthetic plastic material, said bottom having a first side and a second side; a coaxial annular hub integral with and extending from the first side of said bottom, said hub and said bottom consisting of same material; and a comparatively thin coaxial wall connected to and extending from the second side of said bottom, said wall consisting of resiliently yieldable synthetic plastic material, forming an integral seamless joint with said bottom, and defining therewithin a cavity extending to the second side of said bottom.

15. A substantially pot-shaped actuating knob for use in the interior of an automotive vehicle or the like comprising, in combination, a thick-walled annular bottom consisting of a tough, comparatively hard synthetic plastic material, said bottom having a first side, a second side, an annular extension projecting from said second side, and an external annular groove; a coaxial annular hub integrally connected with and extending from the first side of said bottom, said bottom and said hub consisting of same material; and a combined wall and cover member of resiliently yieldable synthetic plastic material, said wall and said cover member defining therewithin a cavity and said wall having a free end formed with an inwardly extending annular flange received in said groove for releasably connecting the wall to said bottom.

16. A substantially pot-shaped actuating knob for use in the interior of an automotive vehicle or the like comprising, in combination, a thick-walled annular bottom member having a first side and a second side; a coaxial annular hub connected to and extending from the first side of said bottom member; a comparatively thin coaxial wall member connected to and extending from the second side of said bottom member, said wall member consisting of resiliently yieldable material, defining therewithin a cavity extending to said bottom member, and having an open end distant from the bottom member; a resilient concave cover member inserted into said cavity and sealing the open end of said wall member; and a decorative ring spaced from said wall member and inserted into that side of the cover member which is turned away from the second side of said bottom member.

17. A substantially pot-shaped actuating knob for use in the interior of an automotive vehicle or the like comprising, in combination, a thick-walled annular bottom member having a first side and a second side; a coaxial annular hub connected to and extending from the first side of said bottom member; a comparatively thin coaxial wall member connected to and extending from the second side of said bottom member, said wall member consisting of resiliently yieldable material, defining therewithin a cavity extending to said bottom member, and having an open end distant from said bottom member; a resilient concave cover of discoid shape inserted into said cavity and sealing the open end of said wall member, said cover having a concave side turned away from said bottom member and a coaxial annular groove formed in said concave side, said groove bounded by an undercut annular face; and a decorative ring snapped into said groove, said ring being of V-shaped cross-sectional contour and comprising a first portion sealing said groove and extending substantially tangentially with respect to said concave side and a second portion adjacent to said undercut face.

18. A substantially pot-shaped actuating knob for use in the interior of an automotive vehicle or the like comprising, in combination, a thick-walled annular bottom member having a first side and a second side; a coaxial annular hub connected to and extending from the first side of said bottom member; a comparatively thin coaxial wall member connected to and extending from the second side of said bottom member, said wall member consisting of resiliently yieldable material, defining therewithin a cavity extending to said bottom member, and having an open end distant from said bottom member; a resilient concave cover of discoid shape inserted into said cavity and sealing the open end of said wall member, said cover having a concave side turned away from said bottom member and a coaxial annular groove formed in said concave side, said groove bounded by an undercut annular face and by a plano bottom face; and a decorative ring snapped into said groove, said ring being of V-shaped cross-sectional contour and comprising a first portion sealing said groove and extending substantially tangentially with respect to said concave side and a second portion adjacent to said undercut face and extending to said bottom face.

19. A substantially pot-shaped actuating knob for use in the interior of an automotive vehicle or the like comprising, in combination, a thick-walled annular bottom member having a first side and a second side; a coaxial annular hub connected to and extending from the first side of said bottom member; a comparatively thin coaxial wall member connected to and extending from the second side of said bottom member, said wall member consisting of resiliently yieldable material, defining therewithin a cavity extending to said bottom member, and having an open end distant from said bottom member; a resilient concave cover of discoid shape inserted into said cavity and sealing the open end of said wall member, said cover having a concave side turned away from said bottom member, a coaxial annular groove formed in said concave side, said groove bounded by an undercut annular face, and a convex side turned toward said bottom member and formed with an annular bead of a diameter approximating the diameter of said groove; and a decorative ring snapped into said groove, said ring being of V-shaped cross-sectional contour and comprising a first portion sealing said groove and extending substantially tangentially with respect to said concave side and a second portion adjacent to said undercut face.

20. A substantially pot-shaped actuating knob for use in the interior of an automobile or the like comprising, in combination, a thick-walled annular bottom member having a first side and a second side; a coaxial annular hub connected to the first side of said bottom member; a comparatively thin coaxial wall member connected to the second side of said bottom member, said wall member consisting of resiliently yieldable material, defining therewithin a cavity extending to said bottom member, and having an open end distant from said bottom member; a resilient cover member of transparent material releasably connected with and sealing the open end of said wall member, said cover member having a side turned toward said bottom member; a soft cushion of resilient material inserted into and partially filling said cavity, said cushion bearing against said bottom member and against said cover member; and a layer of light reflecting material applied to the side of said cover member for concealing said cushion.

References Cited in the file of this patent

UNITED STATES PATENTS

| | | |
|---|---|---|
| 1,993,938 | McDonald | Mar. 12, 1935 |
| 2,107,204 | Macksey | Feb. 1, 1938 |

FOREIGN PATENTS

| | | |
|---|---|---|
| 1,181,840 | France | Jan. 12, 1959 |